Oct. 27, 1931.   G. T. SCHMIDLING   1,829,019
PHOTO ELECTRIC TUBE
Filed July 26, 1929
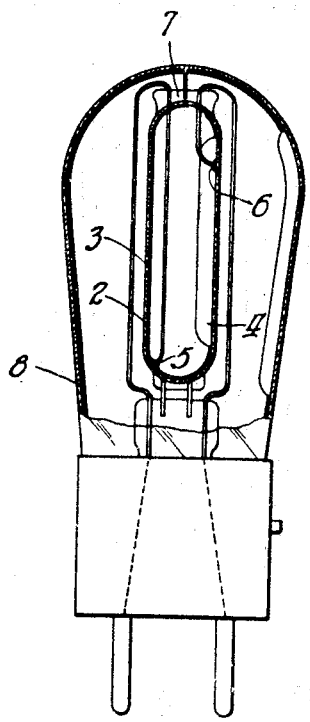
Inventor
Gilbert T. Schmidling
By Zabel & Banning Attys.

Patented Oct. 27, 1931

1,829,019

UNITED STATES PATENT OFFICE

GILBERT T. SCHMIDLING, OF CHICAGO, ILLINOIS, ASSIGNOR TO ALVA J. CARTER, OF CHICAGO, ILLINOIS

PHOTO-ELECTRIC TUBE

Application filed July 26, 1929. Serial No. 381,226.

My invention relates to photo-electric cells, and more particularly to means whereby such cells may be properly insulated in order that they may be used in places where the temperature would otherwise be too high for them.

In one of the present industries which takes a number of photo-electric cells, the cells are subjected to considerable heat because they are necessarily placed close to an electric light that gives off an enormous amount of heat. The industry mentioned is the talking movie industry, which is so popular at the present time.

Now, these photo-electric cells usually consist of a glass tube coated with some light responsive material on the interior thereof, such, for instance, as sodium, potassium or caesium hydride. Of these the potassium hydride is most commonly used, and the warmest temperature at which it will operate is slightly below the melting point of this compound.

In order to avoid the cells breaking down with a very short life, I propose to provide the cell with a heat insulating envelope to keep the heat away.

In order to illustrate the invention, I have shown, in the figure of the drawings, one embodiment of the device which I have found to be quite successful.

In this embodiment, the inner vessel 2 constitutes the photo-electric cell and is formed with glass having an inner coating 3 of potassium hydride or some other suitable light sensitive material, which coating is removed to provide a window 4 at one side of the cell. Suitable electrical connections are made at 5 and 6, one of which, the connection 5, is to the coating, and the other of which is insulated from the coating, as shown clearly in the drawing. These connections 5 and 6 are then passed outwardly through a suitable stem portion 7 on the cell. This cell is the usual photo-electric cell, and in order to prevent its being overheated, I preferably mount it in an evacuated tube 8, which is evacuated to a very high degree so as to practically form a heat insulator that will prevent exterior heat from being conducted to the inner tube.

This outer tube may also be coated with magnesium, with the exception of a portion opposite the window in the inner tube, this coating, of course, being placed on the interior of the tube. The effect of the magnesium coating is that it acts as an absorber or getter to keep the vacuum high within the tube, and also tends to reflect the heat away from the tube surface. Magnesium also forms another barrier for heat rays of the infra red type, which would ordinarily pass through the glass.

It will be noted that the inner tube is suspended both at top and bottom by means of fine wires. The purpose of this is to cut down the amount of conductive action of the supporting wires, so that they will not conduct much heat from the outer surface to the inner tube.

The leads which connect to the interior of the photo-electric cell are brought in at the bottom of the tube and extended through to the top thereof before they enter the cell, because this prevents any great amount of conduction of heat along these leads, and thus further aids in maintaining the cell insulated. These leads are, of course, made of as fine a wire as possible to limit their heat conductivity to the interior of the cell. The currents, of course, from the photo-electric cell are so small that their heating effect may be ignored.

From the above description, it is thought that the construction and advantages of this device will be clear to those skilled in the art, and having thus described my invention, what I claim as new and desire to secure by Letters Patent is:

1. A photo-electric tube construction comprising an inner sealed envelope having therein a light sensitive cathode and an anode and having a translucent wall portion through which light may pass from the exterior to said cathode, an outer sealed evacuated envelope in which said inner envelope is supported in spaced relation to the walls of said outer envelope, and lead in wires extending from said cathode and anode to the exterior of said outer envelope.

2. A photo-electric tube construction comprising an inner sealed envelope having therein a light sensitive cathode and an anode and having a translucent wall portion through which light may pass from the exterior to said cathode, an outer sealed evacuated envelope in which said inner envelope is supported in spaced relation to the walls of said outer envelope, and lead in wires extending from said cathode and anode to the exterior of said outer envelope, said lead in wires entering the inner envelope through the end most distant from their point of entry into the outer envelope.

3. A photo-electric tube construction comprising an inner sealed envelope having therein a light sensitive cathode and an anode and having a translucent wall portion through which light may pass from the exterior to said cathode, an outer sealed evacuated envelope in which said inner envelope is supported in spaced relation to the walls of said outer envelope, and lead in wires extending from said cathode and anode to the exterior of said outer envelope, said outer envelope having a translucent portion opposite the translucent portion of said inner envelope and having an interior coating over the remaining portion substantially opaque to light and infra red rays.

4. A photo-electric tube construction comprising an inner sealed envelope having therein a light sensitive cathode and an anode and having a translucent wall portion through which light may pass from the exterior to said cathode, an outer sealed evacuated envelope, oppositely disposed fine suspension elements suspending the inner envelope within the outer envelope, and lead in wires extending from said cathode and anode to the exterior of said outer envelope.

In witness whereof, I hereunto subscribe my name this 15th day of July, A. D. 1929.

GILBERT T. SCHMIDLING.